July 16, 1957 H. G. ALLEN 2,799,227
THRUST BEARING
Filed July 21, 1954 2 Sheets-Sheet 1

WITNESSES
INVENTOR
Harvey G. Allen
BY
ATTORNEY

July 16, 1957  H. G. ALLEN  2,799,227
THRUST BEARING

Filed July 21, 1954  2 Sheets-Sheet 2

United States Patent Office 2,799,227
Patented July 16, 1957

2,799,227
THRUST BEARING

Harvey G. Allen, Oakmont, Pa., assignor to Westinghouse Electric Corporation, East Pittsburgh, Pa., a corporation of Pennsylvania Application July 21, 1954, Serial No. 444,698

12 Claims. (Cl. 103—87)

My invention relates to thrust bearings, and particularly to thrust bearings designed to operate in a fluid having poor lubricating qualities at high speeds with large axial thrust loads.

Where a thrust bearing must operate in a fluid having poor lubricating qualities, it has been suggested in the prior art to use a pressurized thrust bearing instead of the more conventional mechanical type of thrust bearing. In using the term mechanical type of thrust bearing, I mean a thrust bearing designed to operate with a thin film of lubricating fluid separating the thrust surfaces, such as a pivoted pad thrust bearing, or a continuous ring thrust bearing, or one designed to operate with a rolling type of contact between the thrust members, such as a ball bearing or a roller bearing. By the term pressurized thrust bearing, I mean one designed to be supported on a cushion of fluid without depending on the thrust members for support. The use of presurized bearings is highly desirable because they have superior wear and reliability characteristics over a mechanical bearing, when operated in a fluid having poor lubricating qualities.

It has also been suggested in the prior art that the device for pressurizing the fluid for the bearing be built integral with the shaft on which the bearing is mounted, thus eliminating auxiliary equipment and piping. This arrangement is especially advantageous where the pressurized bearing is operated in a sealed system where external connections are not desired, as for example a sealed motor pump unit operating in a pumping system with substantially zero leakage allowance. While building the pressurizing means integral with the shaft eliminates external connections, it creates a new problem in that no pressure is available when the shaft is started. Thus, the bearing will wear abnormally or fail due to lack of sufficient pressure to support the bearing on a cushion of fluid.

In order to solve the problem caused by no pressure during the starting operation of a pressurized thrust bearing with integral pressurizing means, I have designed a pressurized thrust bearing incorporating a mechanical thrust bearing for starting. Thus, during the starting operation when the thrust is small, my thrust bearing will operate as a mechanical thrust bearing requiring little lubrication and no pressure, then when the shaft on which my thrust bearing is mounted reaches operating speed, it will operate as a pressurized thrust bearing with an integral means for pressurizing the fluid. I have also provided positive means whereby the thrust load is automatically shifted from the mechanical thrust bearing to the pressurized thrust bearing at some predetermined speed of rotation of the shaft on which my thrust bearing is mounted; therefore the possibility of failure of the mechanical bearing due to lack of lubrication is greatly reduced when the thrust load increases.

Accordingly, the principal object of my invention is to provide a novel combination mechanical and pressurized thrust bearing for rotating equipment with automatic means for shifting the thrust load from the mechanical thrust bearing to the pressurized thrust bearing when the shaft on which they are mounted reaches a predetermined rotational speed.

Another object of my invention is to provide a novel integral pressurizing means capable of both pressurizing a thrust bearing and circulating the same fluid through a cooling system to cool the remainder of the equipment with which the thrust bearing is associated, and to lubricate other bearings for the same equipment.

Another object of my invention is to provide a novel integral pressurizing means for rotating equipment which produces axial thrust in a direction opposite to that produced by the equipment so as to remove the thrust load from the mechanical thrust bearing for the equipment.

Another object of my invention is to provide a novel thrust bearing construction to control the axial thrust tending to lift the thrust collar from the mechanical thrust bearing so that the thrust collar reaches a state of equilibrium and is supported by a cushion of pressurized fluid.

Another object of my invention is to provide a novel combination mechanical and pressurized thrust bearing for rotating machinery requiring no external connections and adapted to be operated in sealed equipment.

Further objects of my invention will be apparent from the following detailed description of a preferred embodiment taken in conjunction with the accompanying drawings, in which.

Figure 1:
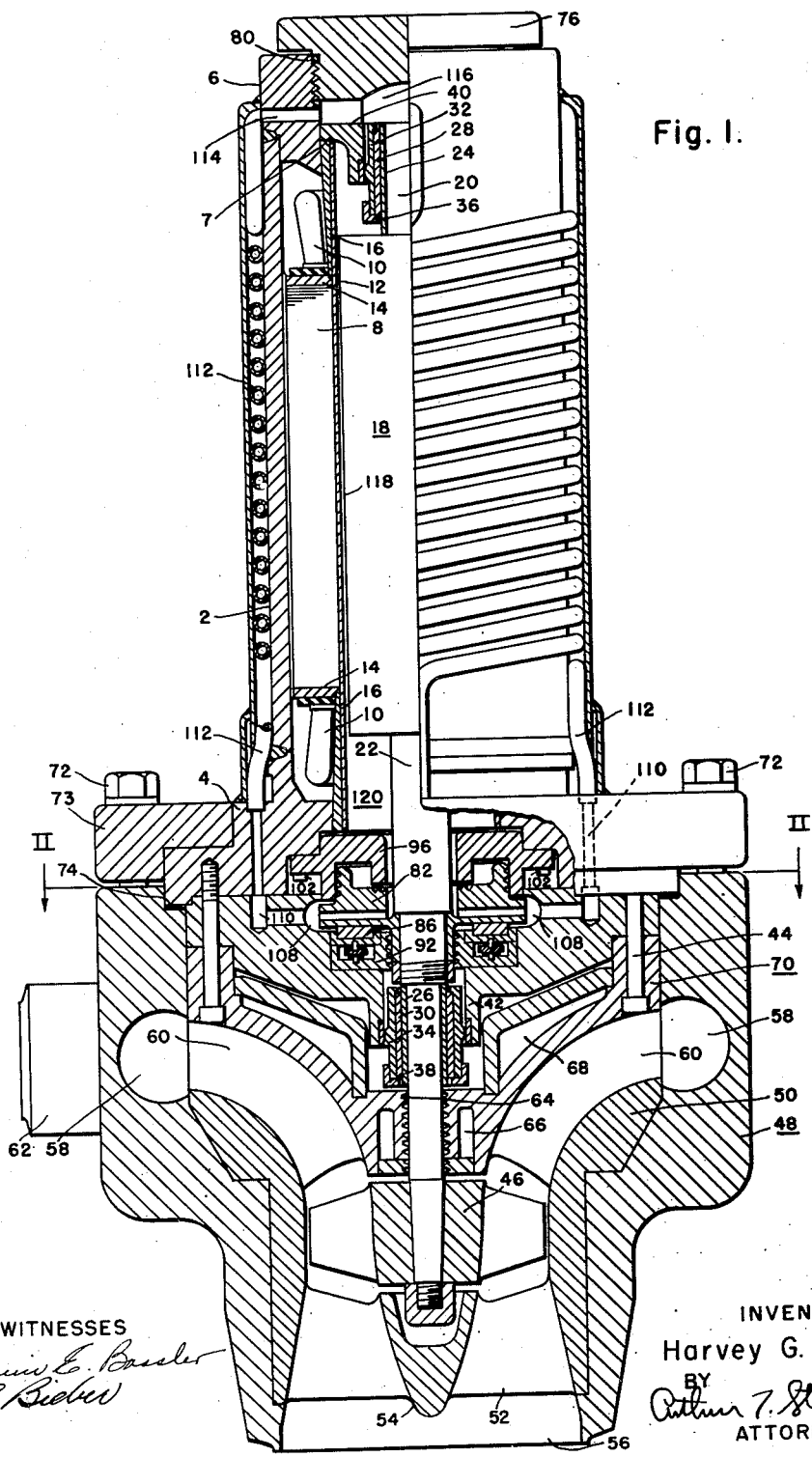
Figure 1 is a partial longitudinal section of a sealed motor pump unit with a thrust bearing embodying my invention installed, and with an enclosed motor cooling system.

The illustrative embodiment of the invention, shown in Fig. 1, includes a thrust bearing constructed according to my invention installed in a sealed motor pump unit which is designed to operate with the rotor of the motor unit immersed in the pumped fluid. In addition, the pump fluid is used to lubricate the thrust bearing and journal bearings, and to cool the motor unit.

The motor unit, shown in Fig. 1, has a solid tubular motor frame 2 with annular end plates 4 and 6 attached at each end in any desired way, as by welding. A stator core 8 comprised of suitable laminations of magnetic material includes a stator winding having end turns 10, all positioned on the inside of the motor frame 2. The stator core 8 and its winding are hermetically sealed in the motor frame 2 by a thin walled metal cylinder 12 which is welded at each end to the adjacent end plates 4 and 6. The cylinder 12 is supported in the center by the stator core 8 and at each end by a ring structure. Each ring structure is comprised of a back-up cylinder 16 which in turn is attached at one end by the adjacent end plate 4 or 6 by any suitable means such as welding, and supported at the other end by a finger ring 14. The above construction for hermetically sealing a stator core and its windings in a motor frame is more particularly described and claimed in the copending application of B. Cametti and W. M. Wepfer, on Pumps, Serial No. 440,826, filed July 1, 1954, and also assigned to the same assignee as my application.

A rotor 18 of a type designed to operate while immersed in the fluid being pumped, such as a solid rotor, has shaft extensions 20 and 22 at each end. The rotor may also be comprised of a core of magnetic material containing a squirrel cage winding which is sealed in a thin walled metal cylinder so as to isolate the squirrel cage winding from the pumped fluid. The shaft extensions 20 and 22 may be shrunk or otherwise rigidly attached to the rotor core. Bearing journals 24 and 26 are shrunk on shaft extensions 20 and 22, respectively, and are mounted in cooperating sleeve bearings 28 and 30 of a hard brittle material, preferably carbon, graphite, or a ceramic material. Sleeve bearings 28 and 30 are retained in outer cartridges 32 and 34, respectively, by means of end caps 36 and 38. The bearing construction described above is more particularly described and claimed in the copending application of B. Cametti and W. M. Wepfer, on Bearings, Serial No. 440,827, filed July 1, 1954, and assigned to the same assignee as my application.

Bearing cartridges 32 and 34 containing sleeve bearings 28 and 30, respectively, are supported in any desired manner by annular support members 40 and 42, respectively. Support member 40 is mounted on a projecting flange 7 in the opening through end plate 6, and is secured in place by the end cap 76, while support member 42 is attached to end plate 4 by means of bolts 44.

A rotary pump impeller 46 is mounted on shaft extension 22 and is designed to draw fluid in through suction inlet 56 in pump casing 48 and impel it upwardly and outwardly as viewed in Fig. 1, through pump passage 60 into an annular area 58 formed in the pump casing 48, from which it flows out the discharge opening 62. A tubular insert 50 is shrunk or otherwise securely mounted in pump casing 48, and contains a cone-shaped element 54 supported beneath impeller 46 by integral webs 52 for directing the flow of fluid through the suction opening to the pump impeller 46. Also mounted in the pump casing 48 is a composite member 70 which is attached to end plate 4 by means of the same bolts 44 which were used to attach bearing support member 42 to end plate 4. Composite member 70 is formed to include the discharge passageways 60, which serve to direct the pumped fluid from the impeller 46 into the annular area 58.

Composite member 70 may be formed to provide a labyrinth type of seal 64 comprising a plurality of V-shaped annular projections on the inner periphery of member 70, which are designed to prevent the pump fluid from freely flowing from the discharge side of pump impeller 46 into the motor unit, but allows the fluid to seep by, thus filling the motor unit with pump fluid at substantially full system pressure. Sealed annular cavities 66 and 68 are also formed in member 70 and are designed to act as a thermal barrier to inhibit the flow of heat from the pump fluid to the motor unit. This general construction of a labyrinth shaft seal and thermal barriers is more particularly described and claimed in the pending application of B. Cametti and A. C. Hagg, on Pumps, Serial No. 440,628, filed July 1, 1954, and assigned to the same assignee as my application.

The motor unit, containing the rotor 18 and the journal bearings 28 and 30, is attached to the pump casing 48 by means of bolts 72 which pass through the clamping ring 73 and serve to draw the end plate 4 into a pressure tight seal with the adjacent end of the pump casing 48. A gasket 74 of resilient material, preferably copper, is placed between the end plate 4 and the pump casing 48, in order to insure a pressure tight seal between these two elements.

The opening in end plate 6 is closed by means of the end cap 76, which is threaded into end plate 6. Sealing ring 80 of resilient material, preferably a synthetic rubberlike material, is used to insure the pressure-tight seal between end cap 76 and end plate 6. In addition, end cap 76 retains the bearing support member 40 in end plate 6 against a projecting flange 7 in the opening through the end plate 6, as previously described.

Figure 2:
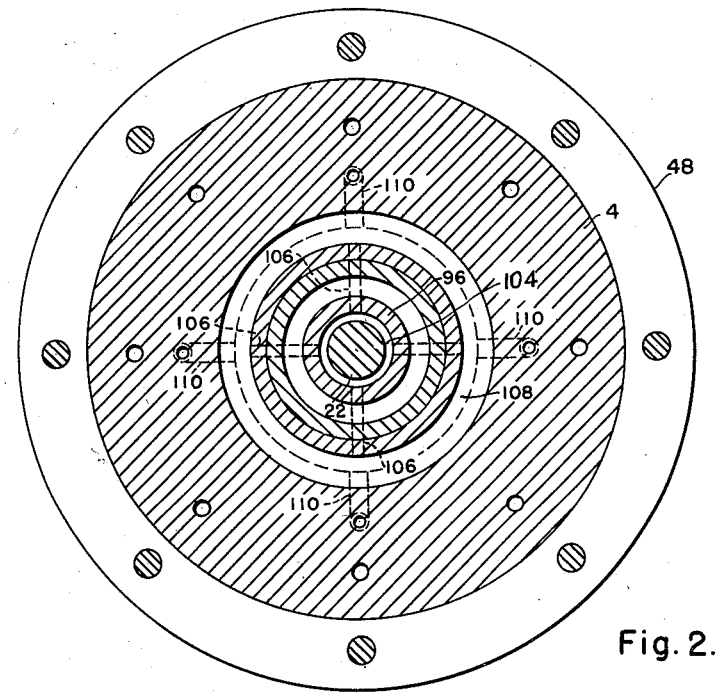
Fig. 2 is a cross sectional view of the motor pump unit shown in Fig. 1 taken along line II—II of Fig. 1 showing certain construction details of my thrust bearing.

The axial thrust of the motor pump unit is absorbed by a thrust bearing (Figs. 2 and 3) which includes a thrust collar 82 which is rigidly mounted on a reduced portion of shaft extension 22 by means of a nut 84. Thrust collar 82 is designed to rotate with the motor pump unit and has one smooth surface 83 which runs in cooperation with a plurality of annularly arranged pivoted thrust pads 86, which in turn are each pivotally mounted on the spherical end of a pin 88. The pins 88 may be supported on pivoted links 90, to form a pivoted pad thrust bearing of the fully equalized self-leveling type. This type of bearing is illustrated in the aforementioned copending application, Serial No. 440,827. Links 90 are mounted in an annular channel-shaped retaining member 92, which, in turn is mounted in an annular recess in bearing support member 42. Retaining member 92 has a labyrinth type seal 94 formed on its inner surface, similar to the labyrinth seal 64, which prevents the free flow of pumped fluid along the shaft 22 in either direction but allows it to seep by in either direction.

The surface of thrust collar 82 opposite the pivoted thrust pads 86 has formed thereon two labyrinth seals 98 and 100. The labyrinth seal 98 is formed near the outer periphery of thrust collar 82 on a surface which extends in a direction parallel to the axis of the motor pump unit, while the labyrinth seal 100 is formed near the inner periphery of the thrust collar 82 on a surface which extends in a plane perpendicular to the axis of the motor pump unit. An annular inverted U-shaped member 96 is attached to end plate 4 by means of an outwardly projecting flange 103 having bolts 102 extending therethrough, and it has the inner surface 97 of one leg which cooperates with the aforementioned labyrinth seal 98, and the outer end of its other leg which cooperates with seal 100, to form a substantially rectangular-shaped annular cavity 101 on top of thrust collar 82. An annular inlet opening 104 (Fig. 2) extends from radial passages 106 in thrust collar 82, to the area 120 on top of member 96, and serves to conduct fluid contained in the motor unit to radial passageways 106 in thrust collar 82. When the thrust collar 82 rotates with the motor pump unit, it acts as a centrifugal pump as the fluid in radial passageways 106 is impelled radially outward into the annular-shaped cavity 108 formed in member 42, and is thus pressurized.

Figure 3:
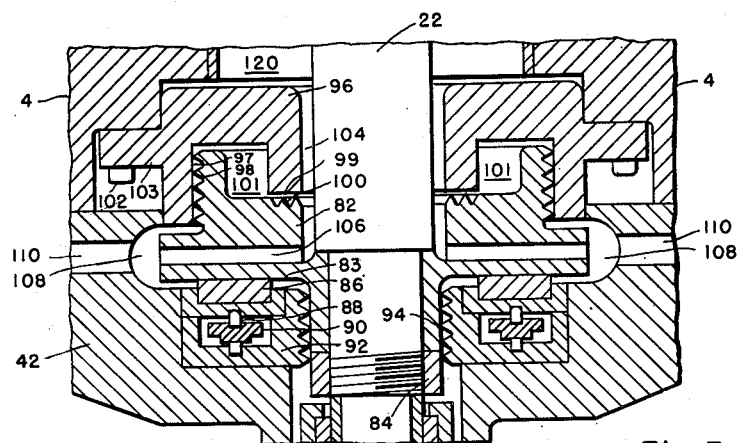
Fig. 3 is a longitudinal sectional view of the thrust bearing shown in Fig. 1 on an enlarged scale.

When the motor pump unit, as shown in Figs. 1 and 3 is at rest, the labyrinth seal 100 is not in sealing contact with the surface 99 of member 96. Thus, when the motor pump unit is placed in operation, the centrifugal pump inlet 104 of the thrust collar 82 will tend to draw fluid from the rectangular-shaped cavity 101 of member 96. As the motor pump unit increases in speed and pressurizes the pump fluid in cavity 108, it will flow from the cavity 108 into the area surrounding the pivoted pad thrust bearing 86 but will be prevented from escaping from this area by the labyrinth seal 94. The pressurized pump fluid in area 108 will also be prevented from flowing into the rectangular-shaped cavity 101 in member 96 by the labyrinth seal 98. Thus the surface 83 thrust collar 82 cooperating with pivoted pad thrust bearing 86 will be subject to the discharge pressure of the rotary pump impeller formed in thrust collar 82, while the opposite surface will be subject to a reduced pressure due to the suction of said impeller. This difference in pressures will cause the thrust collar 82 to move up at a predetermined speed and be lifted off of the pivoted thrust shoes 86 and supported by a cushion of pressurized fluid. The speed of rotation at which the thrust collar 82 moves up and is lifted from the pivoted thrust shoes 86 can be accurately set for any given thrust load by the proper choice of outside diameters for the thrust collar 82 and the labyrinth seal 98. As the thrust collar 82 moves, the labyrinth seal 100 will come into sealing contact with the surface 99 of member 96. When this sealing relationship is established, the rectangular-shaped cavity 101 in member 96 will no longer be subject to the reduced pressure due to the rotary pump impeller contained in thrust collar 82, and thus, the axial movement of the thrust collar 82 will be arrested and the thrust collar 82 will remain in equilibrium. The labyrinth seal 98 is designed to allow a small amount of the pressurized fluid in area 108 to seep by so that the pressure in the rectangular-shaped cavity 101 of member 96 will gradually increase as the labyrinth seal 100 establishes a sealing relationship with the surface 99 on member 96. If this pressure build-up should become too high, it will tend to force the thrust collar 82 down and thus open the labyrinth seal 100, in which case the rotary pump impeller in thrust collar 82 will reduce the pressure in cavity 101 due to its suction. When the pressure in the rectangular-shaped area 101 is reduced, the constant pressure on the opposite surface of thrust collar 82 will tend to force the thrust collar 82 up and thus move the labyrinth seal 100 back into sealing relation with the surface 99. It will thus be seen that my thrust bearing will automatically seek an axial position of equilibrium where the thrust collar 82 is borne on a cushion of pressurized fluid and is completely out of contact with the pivoted thrust pads 86.

I have thus provided a thrust bearing which incorporates a mechanical type of thrust bearing for the starting operation when no pressurized fluid will be available from the rotary pump impeller of thrust collar 82, and a pressurized bearing for normal operation when pressure is available. I have also provided automatic means for converting the mechanical type of thrust bearing when the rotary pump impeller of thrust collar 82 builds up sufficient pressure in the fluid due to the rotational speed of the motor pump unit, to a pressurized thrust bearing where the thrust collar of the unit is supported on a cushion of pressurized fluid.

Connecting with area 108 are passageways 110 each extending through the member 42 and the end plate 4. Passageways 110 connect with coiled tubes 112 which surround and are in intimate contact with the outside of motor frame 2, and connect with passageways 114 contained partly in end plate 6 and partly in end cap 76. Thus, part of the pressurized fluid in area 108 will flow through the coiled tubes 112 where it can be cooled and cool the motor unit, then into the area 116 of the top of the motor unit by means of passageways 114. From area 116, the fluid will flow past bearing 28, through the air gap 118 in the motor unit, and back into area 120. From area 120, the fluid will flow by means of the annular inlet passage 104 back to the suction side of the rotary pump impeller contained in thrust collar 82. The journal bearing 30 is lubricated by the pump fluid that seeps by labyrinth seal 64 into the motor unit. The general construction of the motor cooling and lubrication system just described is more particularly described and claimed in the previously mentioned copending application of B. Cametti and W. M. Wepfer on Pumps, Serial No. 440,826.

While I have shown my invention in one form, it will be obvious to those skilled in the art that it is not limited to this particular embodiment but is susceptible to various changes and modifications without departing from the broad spirit and scope of the invention. For example, other types of mechanical bearings could be substituted for the pivoted pad and thrust bearing shown. Also while I show my thrust bearing installed in a sealed motor pump unit, it is adaptable to be installed in other rotating equipment where a source of fluid capable of being pressurized is available. Likewise, other types of seals may be substituted for the various labyrinth seals I have shown. Accordingly, the invention should be interpreted as broadly as permitted by the prior art.

I claim as my invention:

1. A thrust bearing comprising a thrust collar mounted on a shaft and rotatable with said shaft, a mechanical thrust bearing cooperating with said thrust collar, means operated by said shaft for supplying a fluid under pressure to said thrust collar in a manner to lift the thrust collar from said mechanical thrust bearing and additional fluid means for arresting the movement of said thrust collar and causing it to be supported by said pressurized fluid.

2. A thrust bearing comprising a thrust collar mounted on a shaft and rotatable with said shaft, a pivoted shoe thrust bearing mounted in a position cooperating with said thrust collar, means operated by said shaft for supplying a fluid under pressure to said thrust collar in a manner to lift the thrust collar from said pivoted shoe thrust bearing and cause the thrust collar to be supported by said pressurized fluid.

3. A thrust bearing comprising a thrust collar mounted on a shaft and rotating with said shaft, a mechanical thrust bearing cooperating with one face of said thrust collar, means operated by said shaft for supplying a fluid under pressure to opposite faces of said thrust collar, means for limiting the pressure applied to the other face of said thrust collar to a lower pressure than is applied to said one face of said thrust collar, so that the net pressure on the collar will lift the thrust collar from said mechanical thrust bearing and additional fluid means for arresting said movement of the thrust collar and maintain the thrust collar in a state of equilibrium supported by said fluid pressure.

4. A thrust bearing comprising a thrust collar mounted on a shaft and rotating with said shaft, a mechanical thrust bearing cooperating with one face of said thrust collar, means operated by said shaft for supplying a fluid under pressure to opposite faces of said thrust collar, means for limiting the pressure supplied to the opposite face of said thrust collar to a lower pressure than is supplied to said one face of said thrust collar to lift the thrust collar from said mechanical thrust bearing, fluid means for arresting the movement of said thrust collar, additional means for increasing the pressure of the fluid supplied to said other face of the thrust collar as the rotational speed of said shaft increases to arrest the aforesaid movement of the thrust collar and maintain said thrust collar in a state of equilibrium.

5. A thrust bearing comprising a thrust collar mounted on a shaft and rotating with said shaft, a mechanical thrust bearing cooperating with one face of said thrust collar, means for supplying a fluid under pressure to opposite faces of said thrust collar, means for limiting the pressure supplied to the opposite face of said thrust collar to a lower pressure than is supplied to said one face of the thrust collar, said fluid supply means comprising a rotary pump impeller built integral with said thrust collar, the discharge of said impeller having free access to said one face and restricted access to the opposite face of the thrust collar while the suction of said impeller has access to said opposite face of the thrust collar, whereby said thrust collar is lifted from said thrust bearing, additional means for increasing the fluid pressure supplied to said opposite side as the rotational speed of said shaft increases to arrest the movement of the thrust collar and maintain said thrust collar in a state of axial equilibrium.

6. A thrust bearing comprising a thrust collar mounted on a shaft and rotating with said shaft, a pivoted pad thrust bearing cooperating with one face of said thrust collar, means for supplying a fluid under pressure to opposite faces of said thrust collar, means for limiting the fluid supplied to the opposite face of said thrust collar to a lower pressure than is supplied to said one face of the thrust collar, said fluid supply means comprising a rotary pump impeller built integral with said thrust collar, the discharge of said impeller having free access to said one face and restricted access to the opposite face of the thrust collar while the suction of said impeller having access to said opposite face of the thrust collar, whereby said thrust collar is lifted from said pivoted pad thrust bearing and operated as a pressurized bearing, additional means for increasing the pressure supplied to said opposite side as the rotational speed of said shaft increases to arrest the movement of said thrust collar and maintain it in axial equilibrium, said additional means comprising a fixed annular recessed member positioned over said opposite face of said thrust collar, and forming therewith an annular chamber, cooperating sealing portions on said collar and recessed member, respectively, and located between said annular chamber and the suction side of said impeller, said sealing portions being spaced apart until said thrust collar lifts from said pivoted pad thrust bearing to bring said sealing portions together to form a restrictive seal between the suction side of said impeller and said annular chamber.

7. A motor pump unit comprising, a motor casing secured to a pump casing, a stator mounted in said motor casing, a rotor having a shaft, said shaft being rotatably mounted in said motor casing, a rotary pump impeller mounted on an extension of said shaft in said pump casing, fluid communication means between said motor casing and said pump casings thus submerging the motor unit in the pumped fluid, a thrust bearing comprising a thrust collar mounted on said shaft and rotatable with said shaft, a mechanical thrust bearing cooperating with one face of said thrust collar, means operated by said shaft for supplying said pump fluid under pressure to said thrust collar to lift the thrust collar from said mechanical thrust bearing and additional fluid means for arresting the movement of said thrust collar.

8. A motor pump unit comprising a motor casing sealed to a pump casing and having a stator mounted in said motor casing, a rotor having a shaft, said shaft being rotatably mounted in said motor casing, a rotary pump impeller mounted on an extension of said shaft in said pump casing, fluid communication means between said motor unit and said pump casing, thus submerging the motor unit in the pumped fluid, a thrust bearing comprising a thrust collar mounted on said shaft and rotatable with said shaft, a mechanical thrust bearing cooperating with said thrust collar, means for supplying a fluid under pressure to said thrust collar to lift the thrust collar from said mechanical thrust bearing and additional fluid means for arresting the movement of said thrust collar, said means comprising a second rotary impeller built integral with said thrust collar, a cooling and lubricating system contained in said motor unit, said cooling and lubricating system connecting with the discharge of said second rotary pump impeller so that fluid in the motor unit is circulated through the cooling and lubricating system.

9. A motor pump unit comprising a motor casing sealed to a pump casing and having a stator mounted in said motor casing, a rotor having a shaft, said shaft being rotatably mounted in said motor casing, a rotary pump impeller mounted on an extension of said shaft in said pump casing, fluid communication means between said motor unit and said pump casing, thus submerging the motor unit in the pumped fluid, a thrust bearing comprising a thrust collar mounted on said shaft and rotating with said shaft, a mechanical thrust bearing cooperating with one face of said thrust collar, means for supplying a fluid under pressure to the opposite faces of said thrust collar, means for limiting the pressure supplied to the opposite face of said thrust collar to a lower pressure than is supplied to said one face of said thrust collar, said fluid supply means comprising a second rotary pump impeller built integral with said thrust collar, the discharge of said impeller having free access to said one face and restricted access to the opposite face of the thrust collar while the suction of said impeller has access to the opposite face of said thrust collar, whereby said thrust collar is lifted from said mechanical thrust bearing, a cooling and lubricating system contained in said motor casing, said cooling and lubricating system connecting with the discharge of said second rotary pump impeller so that the fluid in the motor unit is circulated through the cooling and lubricating system.

10. A thrust bearing comprising a thrust collar mounted on a shaft and rotating with said shaft, a mechanical thrust bearing cooperating with one face of said thrust collar, a rotary pump mounted on said shaft for supplying a fluid under pressure to both faces of said thrust collar, said fluid under pressure having free access to said one face, and restricted access to the opposite face of the thrust collar whereby said thrust collar is lifted from said thrust bearing, additional means for increasing the pressure supplied to said opposite face as the rotational speed of said shaft increases to arrest the movement of said thrust collar and maintain it in axial equilibrium comprising, an annular chamber formed by the opposite face of said thrust collar and a fixed member, cooperating sealing means on said thrust collar and said fixed member, respectively, and located between said annular chamber and the suction side of said impeller, said sealing means being inoperative until said thrust collar lifts from said thrust bearing when said sealing means becomes operative to form a restrictive seal between the suction side of said impeller and said annular chamber.

11. A thrust bearing comprising, a thrust collar mounted on a shaft, a mechanical thrust bearing cooperating with one face of said thrust collar, means for supplying a fluid under pressure to both faces of said thrust collar, said fluid having free access to said one face and restricted access to the other face of said thrust collar whereby said thrust collar is lifted from said thrust bearing, additional means for increasing the pressure supplied to said opposite face as the rotational speed of said shaft increases to arrest the movement of said thrust collar and maintain it in axial equilibrium comprising, an annular chamber formed by the opposite face of said thrust collar and a fixed member, means for reducing the pressure in said annular chamber below the pressure of said pressurized fluid until said thrust collar lifts from said bearing when said pressure reducing means becomes substantially inoperative.

12. A thrust bearing comprising, a thrust collar mounted on a shaft, a mechanical thrust bearing cooperating with one face of said thrust collar, means for supplying a fluid under pressure to an annular chamber surrounding the outer periphery of said thrust collar, said fluid having free access to said one face and restricted access to the other face of said thrust collar whereby said thrust collar is lifted from said thrust bearing, additional means for increasing the pressure supplied to said opposite face as the rotational speed of said shaft increases to arrest the movement of said thrust collar and maintain it in axial equilibrium comprising, an annular chamber formed by the opposite face of said thrust collar and a fixed member, means for reducing the pressure in said annular chamber below the pressure of said pressurized fluid until said thrust collar lifts from said bearing when said pressure reducing means becomes substantially inoperative.

References Cited in the file of this patent

UNITED STATES PATENTS 1,436,265   Kingsbury et al. _____ Nov. 21, 1922